2 Sheets—Sheet 1.
C. E. MARK.
Assignor of one-half to J. W. BEGOLE, D. S. FOX and G. L. WALKER.
CAR COUPLING.
No. 10,782. Reissued Nov. 16, 1886.
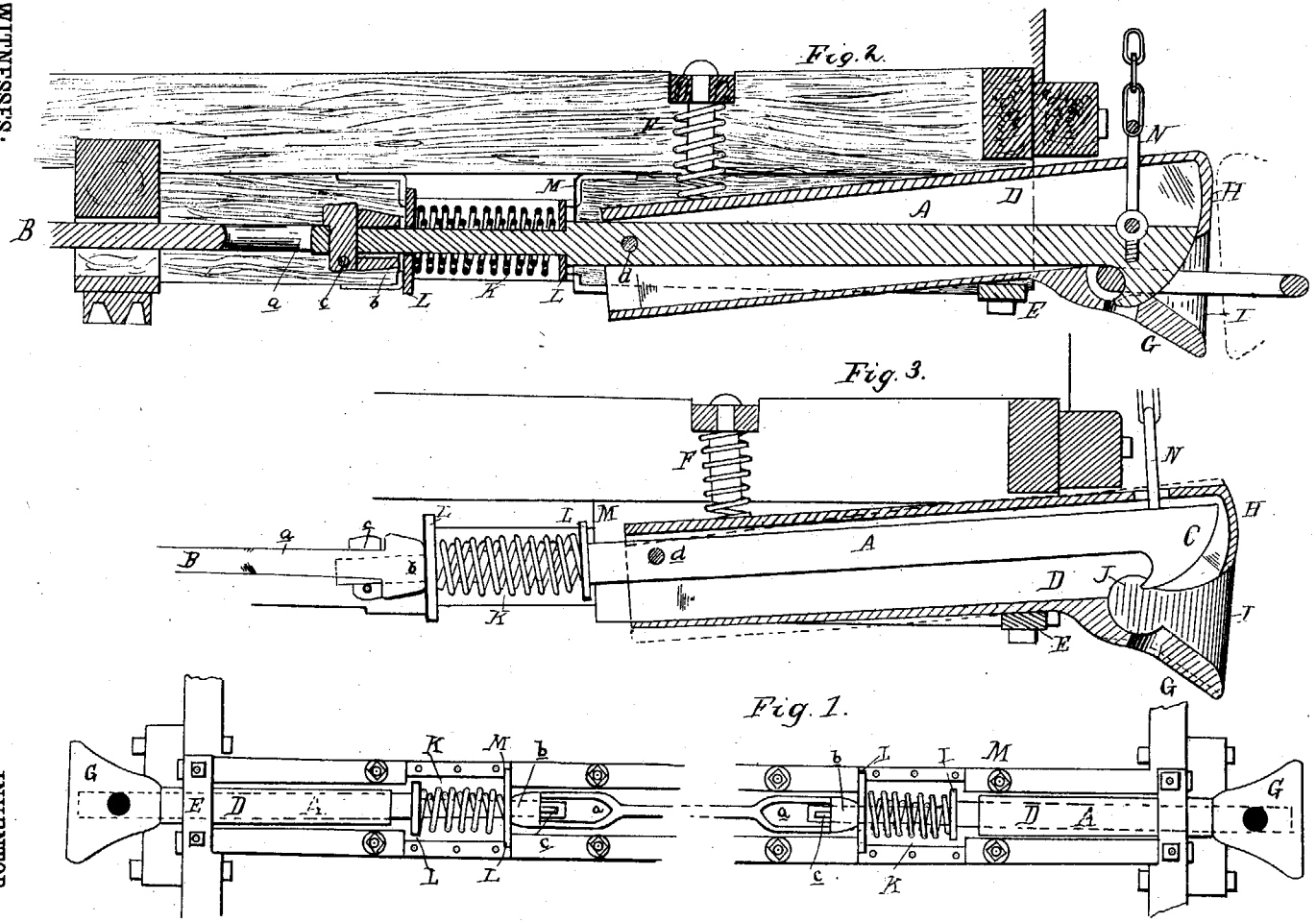
WITNESSES:
W. P. Robertson
E. H. Bond
INVENTOR
Charlie E. Mark
BY J. W. Robertson
ATTORNEY.
N. PETERS, Photo-Lithographer, Washington, D. C.

2 Sheets—Sheet 2.

C. E. MARK.

Assignor of one-half to J. W. BEGOLE, D. S. FOX and G. L. WALKER.

CAR COUPLING.

No. 10,782. Reissued Nov. 16, 1886

WITNESSES:
W. P. Robertson
E. H. Bond.

INVENTOR
Charlie E. Mark
BY T. J. W. Robertson
ATTORNEY.

N. PETERS, Photo-Lithographer, Washington, D. C.

UNITED STATES PATENT OFFICE.

CHARLIE E. MARK, OF FLINT, MICHIGAN, ASSIGNOR OF ONE-HALF TO J. W. BEGOLE, D. S. FOX, AND GEO. L. WALKER, OF SAME PLACE, ASSIGNORS, BY DIRECT AND MESNE ASSIGNMENTS, TO THE MARKS AUTOMATIC CAR COUPLER COMPANY, OF CLEVELAND, OHIO.

CAR-COUPLING.

SPECIFICATION forming part of Reissued Letters Patent No. 10,782, dated November 16, 1886.

Original No. 278,573, dated May 29, 1883. Application for reissue filed January 31, 1884. Serial No. 119,412.

*To all whom it may concern:*

Be it known that I, CHARLIE E. MARK, of Flint, in the county of Genesee and State of Michigan, have invented new and useful Improvements in Car-Couplings; and I do hereby declare that the following is a full, clear, and exact description thereof, reference being had to the accompanying drawings, which form a part of this specification.

This invention relates to certain improvements in car-couplings; and the invention consists in the peculiar construction of the various parts, and their combination and operation, as more fully hereinafter described.

Figure 4:
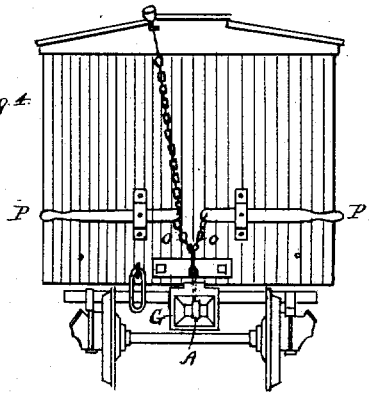
Figure 5:
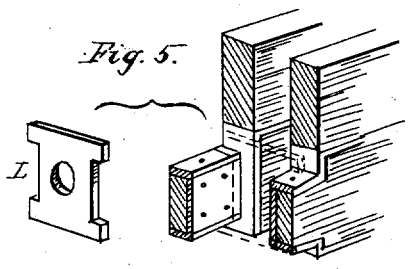

Figure 1 is a bottom plan showing my coupling as attached to a car. Fig. 2 is a vertical longitudinal central section. Fig. 3 is a like view with the coupling-hook in position when not coupled to an adjoining car. Fig. 4 is an end view. Fig. 5 is a detail.

In the accompanying drawings, which form a part of this specification, A represents the two end or hooked sections of a draw-bar, pivotally connected near their rear ends with the central section or draw-bar proper, B, and having hooks C at their free extremities. To give a pivotal connection to these parts the central section or draw-bar proper, B, is provided with a yoke, *a*, at each end, and to the ends of each of these yokes is secured a socket, *b*, through which the inner ends of the sections A pass, and are secured from being withdrawn by suitable keys, *c*, passing through slots in the ends of such sections A.

D represents rectangular iron boxes resting upon the plates or stirrups E—one for each end of the car. They are pivotally secured at their rear ends, each to its own section A, by the bolt or pin *d*, the plate E forming the fulcrum upon which such box D may oscillate as a lever operates, the spring F limiting such movement vertically. The free ends of this rectangular box terminate in an enlarged mouth, G, such enlargement being downward and lateral, as shown in Figs. 2, 3, and 4, and with the upper front portion of said mouth closed by the overhanging part of the casting H, leaving an opening, I, below for the link to enter. The mouth I is shown distinctly in Fig. 3, and leads into an elliptically-shaped chamber, J, so that the link (which is of the usual description) entering abuts against the rear wall of such chamber, allowing the hook C to engage with it. This hook will always be in the position shown in Fig. 2, except when forcibly raised for the purpose of letting the link free, or when raised by the entering link, and as soon as its end passes the hook the latter will drop and engage with it. The peculiar shape of the hook and the peculiar shape of the chamber J are such that the link, when in place, will always project horizontally, and be held in that position except when the outer end of the link may be deflected to enter the coupling of an adjoining car which may be upon a lower or higher plane. The sections A of the draw-bar are inclosed within the rectangular boxes D, and springs K are sleeved upon the inner ends of the sections A to perform the functions of springs of the usual character on draw-bars of the ordinary construction, except that when the draft is applied at one end of the car it first exerts its force upon the coupling at the opposite end of the car, and then upon the spring upon the section of the draw-bar to which the draft is applied, the followers L being so arranged with reference to the springs, the sections A, and the points of resistance M as to allow of this action. The timbers under the floor and sills of the car should of course be arranged with special reference to securing these couplings in place; but such arrangement is but an ordinary exercise of mechanical skill, requiring no inventive power to do this. A pin or link, N, passing through a suitable slot or hole in the top of the box D, is secured to each of the sections A, near their outer ends, and links or chains O are arranged with suitable levers, P, so that the hooks may be elevated at will for the purpose of uncoupling from the top of the car or from the sides thereof, thereby preventing the necessity of entering between the cars for this purpose. I do not desire to confine myself to this precise method of uncoupling, as any of the known methods may be adopted for this purpose. The rectangular boxes D, which inclose the draw-bar, perform the usual functions of buffers by their indirect connection with the springs K, being formed at the pivotal point *d*, where such boxes are connected to the draw-bars, and should from any accident the hooks C be broken, an ordinary coupling-pin may be inserted through the hole in the top through which the pin N passes, and thereby form a coupling with the link, in which case these rectangular buffer-boxes would become portions or sections of the draw-bar; but under no circumstances will they perform any of the functions of the draw-bar except the function of buffing. They simply form guides for the link and draw-bar.

What I claim as my invention is—

1. In a car-coupling, a buffer-box, constructed substantially as described, and not connected with the buffer-spring, a hook draw bar or head, the rear end of which passes through the rear end of such buffer-box, and is pivotally connected with the draw-bar proper, said draw-head carrying upon it the buffer-spring, substantially as and for the purposes specified.

2. The combination, with two draw-bars, each carrying at its rear end a spring and followers, of a connecting-bar provided at each end with a yoke terminating in a socket, and each socket embracing the adjacent end of the draw-bar, and a key passed through the end of the draw-bar within the yoke, whereby the couplings are connected with each other and each spring acts within its own draw-bar both in buffing and drawing, substantially as described.

3. In combination with the buffer-box D and fulcrum-plate E, the hooked draw-bar A, having the said box D pivoted at its rear end thereto, and provided with pin N, and lifting devices, substantially as described, whereby when the draw-bar is elevated the front end of the buffer-box is depressed and the coupling released, as set forth.

4. In a car-coupling device, and in combination with a draw-bar inclosed therein and pivoted thereto, a buffer-box supported upon a fulcrum-plate and provided with a spring by means of which the vertical working movement of said buffer-box is limited, substantially as set forth.

5. In a car-coupler, the combination of the pivoted buffer-boxes D, suitable fulcra, E, the hooked draw-bars A, and suitable elevating devices, with the downward-acting springs F, and means, substantially as described, for operatively connecting said draw-bars and buffers, as set forth.

6. In a car-coupling, a bar running from the rear to the forward coupling, and two springs—one for each part of the coupling—connected with said bar, and the whole constructed and arranged to act on the rear spring first and then upon the front and rear springs jointly, substantially as described.

7. In a car-coupling, two draw-bars and a bar connecting the same, combined with two sets of movable follower-plates, one set for each draw-bar, and each set provided with a spring and a point of resistance for each plate, the rear follower-plate of each set being normally in contact with its point of resistance and the forward or front plate normally out of contact with its point of resistance, substantially as described.

CHARLIE E. MARK.

Witnesses:
H. S. SPRAGUE,
JAY CLARK.